Dec. 25, 1962 H. H. MØRCH 3,070,671
COMBINED RECORD PLAYER AND GRAMOPHONE AMPLIFIER
Filed July 1, 1959
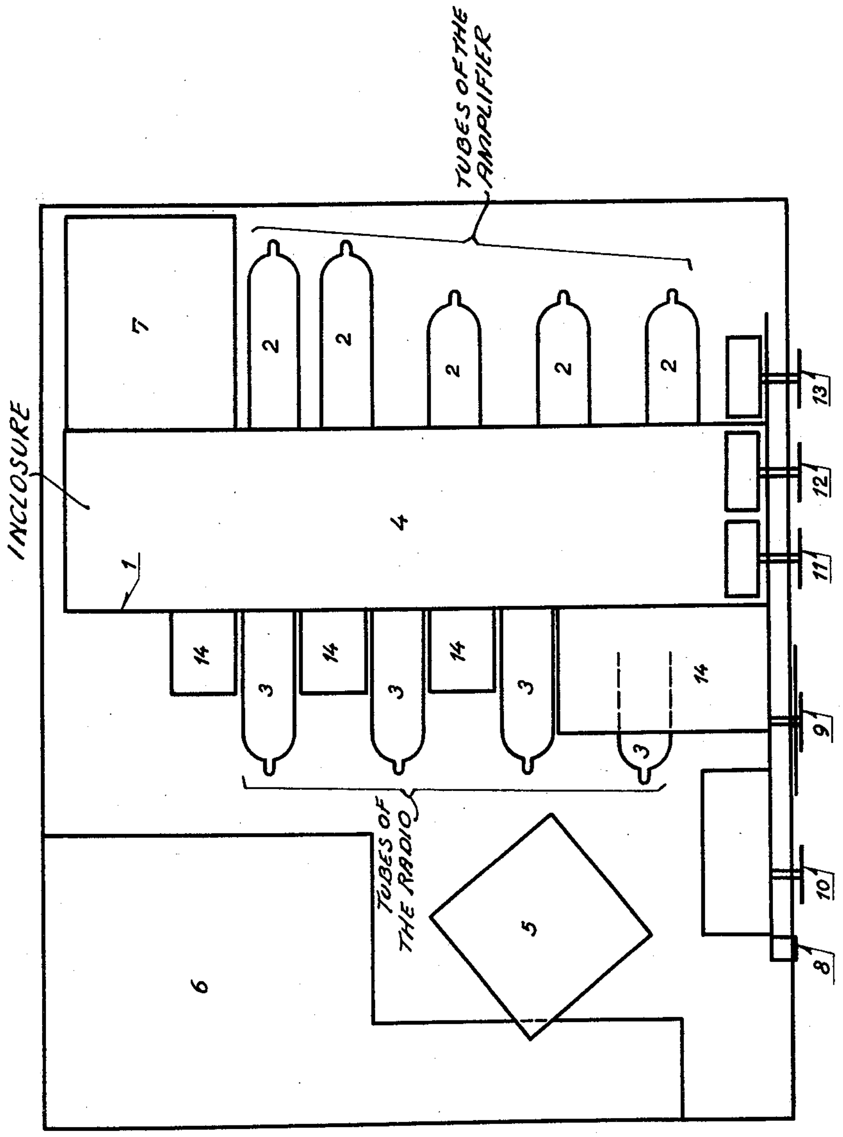

United States Patent Office 3,070,671
Patented Dec. 25, 1962

3,070,671

COMBINED RECORD PLAYER AND GRAMOPHONE AMPLIFIER

Hans Henrik Mørch, Hellerup, Denmark

Filed July 1, 1959, Ser. No. 824,352
Claims priority, application Denmark July 7, 1958
6 Claims. (Cl. 179—100.11)

Quality amplifiers, for instance such types which are used as modern gramophone amplifiers—the so called high fidelity amplifiers—will usually take up much space, partly because of the size of the components partly because of the danger of disturbing electrical coupling, which can influence the quality of sound and make the amplifier unstable. Therefore it is difficult to design a quality amplifier within the confined space of a portable record player. These difficulties are considerably increased if at the same time a radio receiver is incorporated, for instance an FM radio.

The purpose of the invention is to obtain a very compact design of a quality amplifier, possibly including a radio—for instance an FM radio—and a record player. According to the invention this is obtained by placing the parts of the amplifier and the optional radio on a frame-shaped chassis with the tubes pointing horizontally outwards on the longest sides of the frame, which frame-shaped chassis is further placed in a record player case of the type, where the gramophone motor is eccentrically positioned.

A flat and coherent design has been obtained by the arrangement described, thereby allowing a portable record player to include a built-in quality amplifier with the additional optional facility of a radio. The testing of a specimen model has given excellent high fidelity characteristics, exceeding those models of similar electrical design but of more conventional construction commonly marketed. This is due to a special placing of the components in the frame-shaped chassis, which makes possible extremely short wiring. Thus the very compact design on the internal chassis is much better than, for instance, a more or less circular design around a centrally situated gramophone motor. Consequently the construction, herewith proposed, allows for the complete separation of the motor and power supply from the amplifier and radio sections, thus eliminating hum. The components in the frame-shaped chassis are completely screened by the chassis itself, and the output transformer and the tubes of the amplifier are at the same time screened by the chassis.

According to the invention the parts of the amplifier and the optional radio are placed on a frame-shaped chassis 1, on which the tubes are mounted horizontally outwards on the two longest sides of the frame, mainly with the tubes of the amplifier 2 on the side that looks away from the gramophone motor, and the tubes of the radio 3 on the other side. The frame may be box-shaped and supplied with base plate and lid for screening, but alternatively it could be reduced to two single plates or a single plate folded in U form. In the inclosure formed by the frame 4, the amplifier and FM components are placed. The frame-shaped chassis with amplifier and radio is placed in a record player case of the type where the gramophone motor 5 is eccentrically positioned, but it can also be used in quite different arrangements. In the neighbourhood of the motor, the power supply 6 is placed, and the output transformer 7 is placed on the side of the chassis, adjacent to the tubes of the amplifier. The base plate and lid of the record player case is supplied with ventilating openings, which in connection with the horizontal and free placing of the tubes provides excellent natural cooling. The control knobs together with the input terminal 8 to the amplifier can be fixed to the internal chassis in such a way that the equipment can be adjusted from the front, where is placed a scale 9 and a special combined switch 10, which includes power switch and different positions for gramophone reproduction together with input and FM positions. Further there are separate controls for base 11, treble 12 and volume 13 together with an optional magic eye.

What I claim is:

1. Combined record player and gramophone amplifier in which parts of the amplifier are placed on a chassis in the record player case under a record player, characterized in that said chassis is formed like a cylinder with rectangular cross section and the generatrix being of the same order of magnitude as the shortest sides of said rectangular cross section and preferably at right angles to the base plate of said record player case, said chassis inclosing parts of the amplifier with the tubes mounted on at least one of the longer sides of said chassis and pointing away from the inclosure formed by said chassis, said record player being of the type, where the gramophone motor is positioned adjacent to a corner, eccentrically as to the record player case.

2. Combined record player and gramophone amplifier according to claim 1, including a power supply unit, characterized in that the tubes of the amplifier are preferably mounted on the side of the cylinder-shaped chassis that faces away from the power supply unit, which chassis is further supplied with base plate and lid.

3. Combined record player and gramophone amplifier according to claim 1, including a power supply unit, characterized in that the tubes of the amplifier are mounted on the side of the cylinder-shaped chassis that faces away from the power supply unit, adjacent to which unit the gramophone motor is placed, said chassis being further supplied with base plate and lid.

4. Combined record player and gramophone amplifier, containing a radio receiver, in which parts of the amplifier and parts of the radio are placed on a chassis in the record player case under a record player, characterized in that said chassis is formed like a cylinder with rectangular cross section and the generatrix being of the same order of magnitude as the shortest sides of said rectangular cross section and preferably at right angles to the base plate of said record player case, said chassis inclosing parts of the amplifier and the radio receiver and preferably with the radio positioned on the one, and the amplifier on the other of the two longer sides of said chassis with the tubes mounted on the respective sides and pointing away from the inclosure formed by the chassis, said record player being of the type, where the gramophone motor is positioned adjacent to a corner, eccentrically as to the record player case.

5. Combined record player and gramophone amplifier according to claim 4, including a power supply unit, characterized in that the tubes of the amplifier are mounted on the side of the cylinder-shaped chassis that faces away from the power supply unit, which chassis is further supplied with base plate and lid.

6. Combined record player and gramophone amplifier according to claim 4, including a power supply unit, characterized in that the tubes of the amplifier are mounted on the side of the cylinder-shaped chassis that faces away from the power supply unit, adjacent to which unit the gramophone motor is placed, said chassis being further supplied with base plate and lid.

References Cited in the file of this patent

UNITED STATES PATENTS

| | | |
|---|---|---|
| 1,757,304 | Goldsmith | May 6, 1930 |
| 2,114,741 | Hill | Apr. 19, 1938 |
| 2,247,171 | Harman | June 24, 1941 |
| 2,411,528 | Didington | Nov. 26, 1946 |
| 2,530,251 | Luberoff | Nov. 14, 1950 |
| 2,556,421 | Gee | June 12, 1951 |
| 2,588,082 | Brown | Mar. 4, 1952 |